Sept. 13, 1938.  A. A. DURANT  2,129,680
CENTERING DEVICE
Filed Feb. 14, 1936
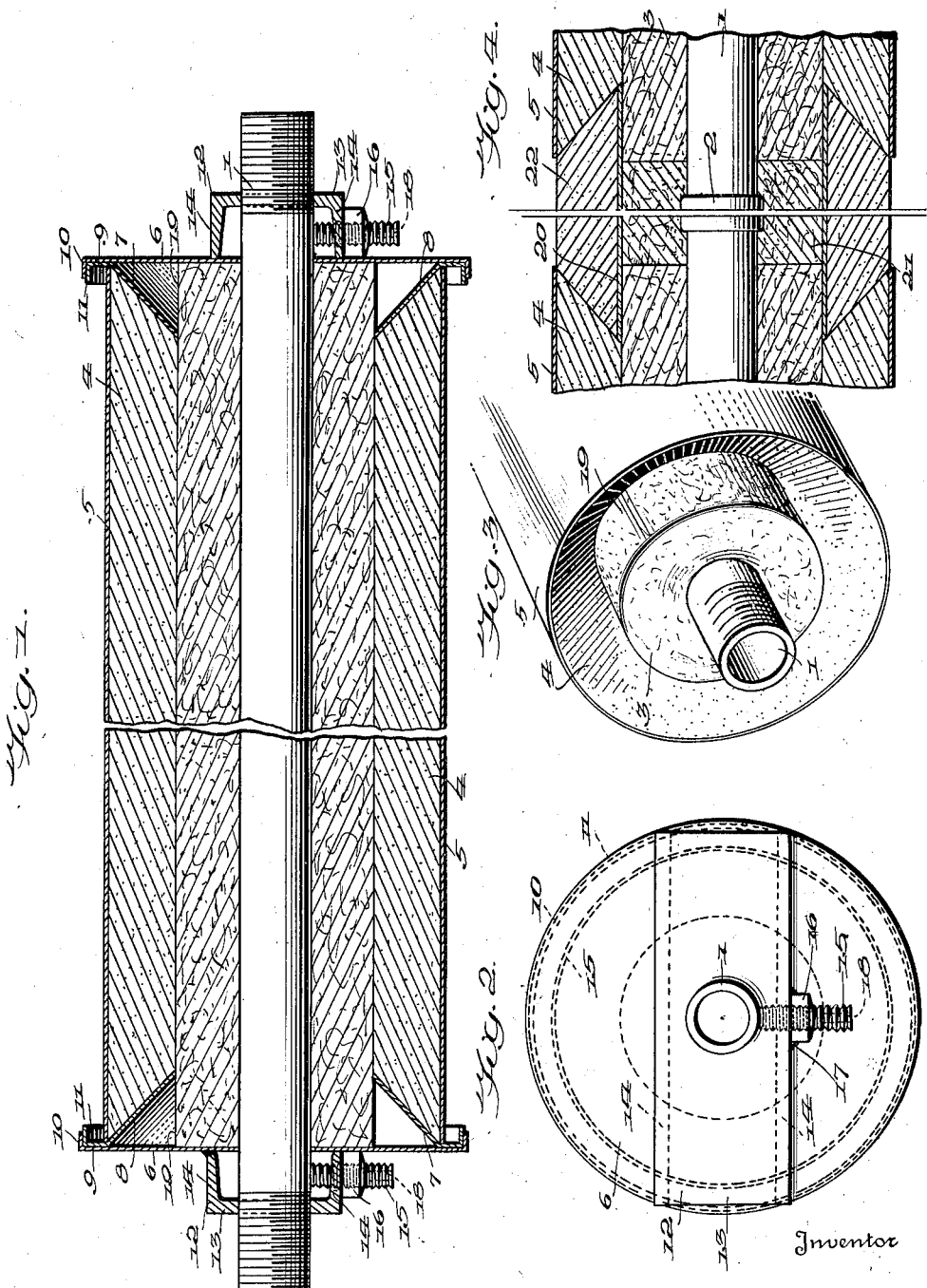
Inventor
Albert A. Durant
By Ritter, Machlin & O'Neill
his Attorneys Patented Sept. 13, 1938

2,129,680

UNITED STATES PATENT OFFICE 2,129,680

CENTERING DEVICE

Albert A. Durant, Honolulu, Territory of Hawaii

Application February 14, 1936, Serial No. 63,958

7 Claims. (Cl. 25—126)

My invention relates to centering devices which are primarily adapted for use in the manufacture of composite conduits of the type disclosed in my Patent No. 1,709,844, dated April 23, 1929, which include a pipe surrounded by insulating material enveloped with a layer of asphaltum which is encased in a metal jacket.

The principal object of the invention is to provide simple and reliable means for centering the encasing jacket with respect to the pipe and insulating material so that an even layer of asphaltum may be deposited between the jacket and insulating material.

Detail features residing in advantageous forms, combinations and relations of parts will hereinafter appear and be pointed out in the claims.

In the drawing:—

Figure 1 is a vertical sectional view illustrating a completely formed section of the composite conduit with the centering devices arranged at opposite ends thereof.

Figure 2 is an end view of a centering device.

Figure 3 is a perspective view adjacent one end of a section of the conduit showing the configuration imparted thereto by the centering device.

Figure 4 is a sectional view illustrating the manner of connecting two sections of the conduit.

Referring more particularly to the drawing, 1 indicates the pipe through which gases or liquids are conveyed, it being, of course, understood that the pipes are formed in sections of the desired length and that the ends of each section are screw threaded to receive any suitable means, such, for example, as the collar 2 for connecting it to adjoining sections.

Surrounding the pipe 1 is insulating material 3 and, while any of the well known insulating agents may be used, it is preferred to use material of the character which is molded and is obtainable in definite lengths, examples of such material being known in the trade as "asbestocel", woolfelt pipe covering and magnesia pipe covering. The insulating material is enveloped by a layer of asphaltum 4 which is encased in a metal jacket or cover 5. While the jacket 5 serves to protect the asphaltum, its primary purpose is to serve as a mold for the asphaltum, which is introduced in a fluent condition between the insulating material and the jacket in any convenient manner, such as through an opening (not shown) in the jacket, as is fully illustrated and described in my patent above mentioned.

The device for centering the jacket 5 with respect to the pipe 1 and insulating material 3, so as to insure the production of a layer of asphaltum of uniform thickness, includes a base or main member 6 which may advantageously be formed from a piece of sheet metal into a substantially circular disk. At its center, the base 6 is formed with an opening for receiving the pipe 1, the opening preferably being only sufficiently large to enable the pipe to be inserted therein.

Disposed on one side of the base member is an element 7 having a forwardly projecting portion 8 provided with an exterior conical surface which is cooperable with the adjacent end of the jacket 5. The forward end of the conical portion 8 is formed with an opening just large enough to enable the insulating material to be inserted therein and abut against the base 6. While the base of the conical portion 8 is shown in the drawing to be of substantially the same diameter as the jacket 5, it will be appreciated that in order to properly center the jacket with respect to the pipe, it must not be of less diameter than the jacket but it may, of course, be of greater diameter. Element 7 may, like the base 6, be formed of sheet metal and the base of the cone preferably merges into a plate-like ring portion 9 which may be advantageously secured to adjacent portions of the base 6 in any suitable manner. If desired, both the base 6 and element 7 may be formed with marginal reinforcing flanges 10 and 11, respectively.

Where, as is usually the case, a plurality of sections of insulating material are used for each pipe section, the insulating material is arranged so as to project sufficiently beyond the ends of the jacket 5 that, when the centering devices are applied to the opposite ends of the pipe, they will engage the ends of the insulating material and, by being forced toward each other, firmly press the insulating sections together, thereby insuring an intimate engagement of the sections and thus preventing the asphaltum, which is subsequently poured around the insulation, from coming in contact with the pipe. The insulating material must not, of course, project sufficiently beyond the ends of the jacket so as to prevent the conical portions 8 of the centering devices from engaging the jacket 5.

Secured, as by welding, on the side of the base 6 opposite the element 7 is a channel-shaped member 12 having a web 13 spaced outwardly from the base 6 and legs 14 extending inwardly from the web into engagement with the base. The web 13 is formed with an opening concentric with the opening in the base plate for receiving the pipe 1 and projecting through one of the legs of the channel is a set screw 15 for engaging the pipe to firmly secure the centering device thereto. This set screw has threaded engagement with a nut 16, which is preferably welded to the adjacent leg of the channel, as indicated at 17. The outer end of the set screw may be formed with a recess 18 of any desired cross sectional shape for receiving a tool whereby the screw may be suitable rotated.

In the manufacture of each conduit section, a pair of the centering devices is used. One convenient method of associating them with the partly formed conduit is to first apply one centering device to one end of the pipe and firmly lock it by the set screw 15 in the desired position, then slip the jacket 5 onto the pipe from the opposite end and finally apply the other centering device to that end, this centering device being shoved on with sufficient force to compress the insulating material, which originally is of slightly greater length than the jacket, between the bases 6 and to center the jacket by the conical portions 8. This mode of use of the centering devices may be slightly modified in that the jacket may be slipped over the insulating material before either centering device is applied to the pipe and other ways in which the invention may be used will be readily apparent.

In addition to serving as an effective and reliable means for centering the jacket 5, the conical portions of the centering devices impart to the ends of each completed conduit section a shape or formation whereby the joints between the sections may be easily insulated and sealed in the field. As shown in the drawing and particularly in Figure 3, portions of the insulating material, indicated by the reference numeral 19, at each end of each conduit section are left exposed and project in the form of circular bosses or the like beyond adjacent portions of the asphaltum. These circular bosses or exposed portions of the insulating material afford convenient means around which adhesive canvas 20 or other suitable material may be wrapped to seal the spaces which, irrespective of the care taken, occur between the ends of the insulating material 3 of adjoining conduit sections and the relatively short piece of insulating material, indicated at 21 in Figure 4, which is applied in the field around the pipe joint. The short pieces 21 of insulating material are preferably of the same external diameter as the insulating material 3 of the conduit sections and any suitable material may, therefore, be easily and quickly wrapped around them and the adjacent unexposed portions of the insulating material of the conduit sections so as to prevent the asphaltum, indicated at 22, which is subsequently applied around the joint from coming in contact with the pipe 1.

Another advantage of imparting a conical formation to the ends of the asphaltum layer is that they have a greater surface area than they would have if they were substantially normal to the axis of the conduit. By providing the ends of the asphaltum layer with a surface of increased area, a more perfect union between the asphaltum originally applied to the conduit sections and that applied in the field is assured.

The formation of the ends of the sections and the manner of connecting adjoining sections forms the subject matter of my copending application Serial No. 213,497, filed June 13, 1938.

What I claim is:

1. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a member adapted to abut against the end of said insulating material and having an opening for receiving said pipe, and a conical member whose axis is substantially coincident with the axis of said opening adapted to encircle the insulating material and to center said jacket with respect thereto.

2. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a plate-like member having an opening for receiving said pipe, and means rigid with said member adapted to encircle said insulating material, said means having an exterior conical surface for centering said jacket with respect to the pipe.

3. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a member having an opening for receiving said pipe, means rigid with said member adapted to encircle said insulating material and having an exterior conical surface for centering said jacket with respect to the pipe, and means carried by said member for immovably securing the centering device to said pipe.

4. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a member having an opening for receiving said pipe, and means secured to said member having a portion projecting forwardly therefrom provided with a conical surface on its exterior, said portion having an opening of greater size than the opening in said member for receiving said insulating material and said conical surface being cooperable with said jacket for centering the latter with respect to said pipe.

5. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a plate-like member adapted to abut against the end of said insulating material and having an opening for receiving said pipe, a conical member adapted to surround said insulating material and to center said jacket with respect thereto, and means rigid with said plate member for firmly attaching the centering device to the pipe.

6. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a plate member having an opening for receiving said pipe, a conical member adapted to surround said insulating material and to center said jacket with respect thereto, and means rigid with said plate member for firmly attaching the centering device to the pipe, said means comprising an angularly shaped member rigid with said plate member and having an opening registering with the opening in the plate member for receiving said pipe, and movable means associated with said angularly shaped member engageable with said pipe.

7. A centering device adapted for use in the manufacture of a conduit comprising a pipe, insulating material surrounding the pipe, a metal jacket encircling said material in spaced relation thereto, and a layer of bituminous material between the insulating material and jacket, said centering device including a plate member having an opening for receiving the pipe, a conical member adapted to surround said insulating material and to center said jacket with respect to said pipe, a channel member carried by said plate member and having a web disposed in spaced relation thereto, said web having an opening registering with the opening in the plate member for receiving said pipe, and means associated with said channel including a movable member engageable with said pipe for securing the centering device thereto.

ALBERT A. DURANT.